United States Patent
Pastor et al.

(10) Patent No.: US 6,852,991 B2
(45) Date of Patent: Feb. 8, 2005

(54) OPTOELECTRONIC SENSOR WITH ADJUSTABLE DEPTH OF FIELD RANGE

(75) Inventors: Sebastian Pastor, Freiburg (DE); Hans-Werner Pierenkemper, Emmendingen (DE)

(73) Assignee: Sick AG, Waldkirch/Breisgau (DE)

( * ) Notice: Subject to any disclaimer, the term of this patent is extended or adjusted under 35 U.S.C. 154(b) by 79 days.

(21) Appl. No.: 10/152,168

(22) Filed: May 20, 2002

(65) Prior Publication Data

US 2003/0006386 A1 Jan. 9, 2003

(30) Foreign Application Priority Data

May 29, 2001 (DE) .......................................... 101 26 086

(51) Int. Cl.[7] ................................................ G01V 8/00
(52) U.S. Cl. ..................................... 250/559.44; 356/3
(58) Field of Search ........................ 250/559.44, 559.12, 250/559.22, 578.1, 559.4, 223 R; 340/555; 356/3, 601; 367/103, 119; 396/80

(56) References Cited

U.S. PATENT DOCUMENTS

| | | |
|---|---|---|
| 4,920,255 A | 4/1990 | Gabeler |
| 5,365,597 A | 11/1994 | Holeva |
| 5,510,603 A | 4/1996 | Hess et al. |
| 5,612,905 A * | 3/1997 | Maillart et al. ........ 250/559.22 |
| 5,874,719 A | 2/1999 | Hippenmeyer et al. |

FOREIGN PATENT DOCUMENTS

| | | |
|---|---|---|
| DE | 37 09 500 A1 | 10/1988 |
| DE | 39 36 126 A1 | 5/1990 |
| DE | 44 22 886 A1 | 1/1996 |
| DE | 44 31 922 A1 | 5/1996 |
| DE | 197 27 459 A1 | 1/1999 |
| DE | 44 39 307 C2 | 7/1999 |
| EP | 0 434 191 A2 | 6/1991 |
| EP | 0 620 680 A1 | 10/1994 |
| EP | 0 652 530 A2 | 5/1995 |

* cited by examiner

Primary Examiner—Thanh X. Luu
Assistant Examiner—Seung C. Sohn
(74) Attorney, Agent, or Firm—Townsend and Townsend and Crew LLP

(57) ABSTRACT

The invention relates to an optoelectronic sensor which has a transmission device for transmitting a strip illumination in the direction of an object zone, a reception device for receiving light reflected or remitted from the object zone and for outputting at least one corresponding reception signal and an evaluation device for evaluating the at least one reception signal. A division of the strip illuminated object region into a plurality of monitoring segments is provided. Furthermore, a distance measuring device is provided by which, for at least one monitoring segment, the distance to an object disposed therein can be determined.

21 Claims, 2 Drawing Sheets

OPTOELECTRONIC SENSOR WITH ADJUSTABLE DEPTH OF FIELD RANGE

BACKGROUND OF THE INVENTION

The invention relates to an optoelectronic sensor having a transmission device for transmitting a strip illumination in the direction of an object zone, a reception device for receiving light reflected or remitted from the object zone and for outputting at least one corresponding received signal, and an evaluation unit for evaluating the at least one received signal.

Sensors of this kind serve in the widest sense for image recognition, that is, for example, for the detection or identification of an object or for the detection of the position, of the rotational position, of an inscription or of a marking of an object.

For this purpose the object zone is exposed to a strip illumination, that is, to one or more light rays which together have a linear, or at least an elongate, cross-section. A tightly restricted solid angle is therefore illuminated with a comparatively high light intensity by such a strip illumination so that a simple line-wise scanning of an object is possible in a known manner. A periodic beam deflection of a laser beam is known, for example, for the realization of such a strip illumination.

It is disadvantageous in the known sensors that their depth of field range is too low to ensure the accuracy of the image recognition required for some applications for different object distances.

SUMMARY OF THE INVENTION

It is an object of the invention to provide a sensor whose depth of field range can be matched in a simple manner to different applications and/or object distances.

This object is satisfied for a sensor of the kind initially named in that a division of the strip illuminated object zone into a plurality of monitoring segments is provided, and in that a distance measuring device is provided by which, for at least one monitoring segment, the distance to an object located disposed therein can be determined.

In the invention, the distance between the sensor and an object within the object zone is therefore determined. An adjustment device can be used to set or constantly track the focus position of the sensor on the distance measured with the aid of this distance information (autofocus function).

It is important that the strip illumination is divided into a plurality of monitoring segments—by a corresponding division of the transmission device and/or of the reception device—and that the distance information is determined segment-wise, that is, for a single one of these monitoring segments or in each case for a plurality of monitoring segments.

This division has the advantage that unambiguous distance information can also be gained for the respective segment for an object with an uneven extent along the strip illumination, which is not easily possible, in contrast, for a uniform distance measurement along the total strip illuminated object zone for an inclined object, for example.

The space determination in accordance with the invention for individual monitoring segments thus ultimately provides the advantage that no complex external distance measuring device is required. The distance measuring device can rather be integrated into the sensor, with components of the sensor, which are anyway required for the image detection, also being able to be used at the same time for the distance measurement. In particular, the strip illumination provided for the determination of a display line can also be used for the distance determination within the distance measuring device.

It must still be noted with respect to the invention that the infrared range or the ultraviolet range is also suitable for the transmitted light and the received light.

It is preferred for the realization of the strip illumination for the transmission device to have an associated transmitter element for each monitoring segment, in particular having its own optical transmission system. It is especially simple thereby to determine the distance in each case for each monitoring segment, for example, according to a phase evaluation method or to a frequency evaluation method. A laser diode or an LED can, for example, be used as the transmitter elements.

It is also possible, alternatively to this, for the transmission device to have a single transmitter element for the total strip illumination. In this case, the distance determination inside the sensor takes place for an individual monitoring segment via a respectively associated receiver element.

Depending on the distance measuring principle used, a single reception device can be provided for the gaining of the image information and of the distance information, or the sensor has an additional reception device, in addition to the reception device provided for the actual sensor purposes, whose received signal is used for the distance determination.

The reception device and/or the additional reception device can be made spatially resolving with respect to the plurality of monitoring segments. It can in particular, as already mentioned, have a plurality of respectively associated receiver elements. In this case, a corresponding number of received signals or of additional received signals are produced.

It is alternatively possible for a single receiver element, for example a PIN diode or an avalanche photodiode, to be provided in conjunction with an astigmatic optical reception system.

In summary, the division of the strip illumination into monitoring segments and the production of distance information relating to a respective monitoring segment can be realized either by a corresponding division of the transmission device, or by a corresponding division of the reception device, or by a combination thereof.

The actual distance determination takes place at least for a single monitoring segment. For example, this specific segment can be provided in an application in which the strip illumination extends transversely to the transport direction of a transport belt with an object to be detected disposed thereon in a central arrangement, that is, over the center of this transport belt.

However, applications are also possible in which more detailed distance information is desirable. It can, for example, be advantageous to determine a distance profile for objects with an uneven contour in order to set the focus position of the sensor for a mean value of the distances measured. It can moreover be desirable to calculate, or at least estimate, the volume of an object disposed in the object zone, or passing through it, from a plurality of distance values. It is preferred for such cases for the distance measuring device for the distance determination to be designed for a plurality of, in particular for all, monitoring segments. In other words, a separate received signal can be provided for each monitoring segment and is used within the distance measuring device for determining the object distance for the relevant segment.

If the distance determination is provided for a plurality of monitoring segments, this can take place sequentially or in parallel for the plurality of segments. In the former case, the monitoring segments are activated successively via the corresponding transmitter elements and/or receiver elements, for example by a multiplexer. In this manner, a large part of the distance measuring device inside the sensor is jointly used for the relevant monitoring segments, which reduces the building effort still further. In contrast, a distance determination carried out in parallel for the plurality of monitoring segments has the advantage of a time saving, which can be of importance in particular with a fast relative movement of the object to be detected.

As already mentioned, the distance determination can be based on a phase evaluation method or a frequency evaluation method, that is, a continuous wave method, as the measuring principle in which ultimately a phase shift taking place along the object distance is measured. For example, the distance measuring device can have a filter module for this purpose which forms a resonant circuit together with the optical path, the transmission device and the reception device or individual elements hereof. It is also possible to provide an oscillator at the transmission side and a phase comparator at the reception side.

It must further be noted with respect to the monitoring segments—in particular those defined by individual transmitter elements that these are arranged perpendicular to the optical axis of the transmission device, preferably adjoining one another, in accordance with the direction of extent of the strip illumination. In this connection, the monitoring segments and/or the corresponding segments of the strip illumination can respectively adjoin one another, be slightly spaced from one another or slightly overlap. With respect to the main function of the sensor of image detection along the strip illumination, it is of advantage if this strip illumination is made as homogeneously as possible—despite the division into segments.

The strip illuminated object zone is preferably divided—on the basis of a corresponding number of transmitter elements and/or receiver elements—into a plurality of monitoring segments. An advantageously high resolution of the distance information along the direction of extent of the strip illumination is thereby achieved. In particular, at least three segments can be provided, namely one central segment and two outer segments.

The invention will be described in more detail by way of example in the following with reference to the drawings.

DESCRIPTION OF THE PREFERRED EMBODIMENTS

Figure 1:
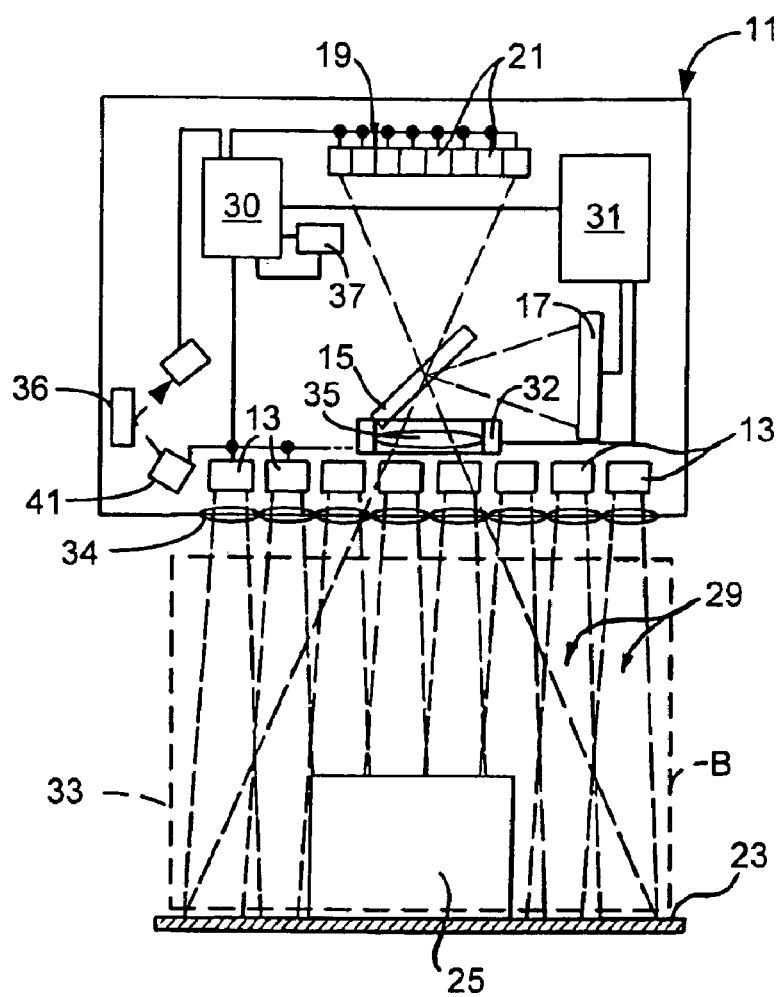
FIG. 1 is a schematic frontal view of an image processing system having a sensor in accordance with the invention and a transport belt arranged thereunder on which an object to be detected is disposed.

In FIG. 1, a sensor 11 is represented with eight transmitter elements 13, for example laser diodes, furthermore with a beam splitter 15, a reception device 17 formed, for example, by a CCD sensor, and with an additional reception device 19 which is formed, for example, by a photo-receiver row and has eight receiver elements 21.

A transport belt 23 is arranged beneath the sensor 11, forms an image processing system together with the sensor 11 and, in an object zone 33, has a package 25 to be detected disposed on it. The transport belt 23 can be moved along a transport direction 27 shown in FIG. 2.

The transmitter elements 13 are fitted with a diaphragm optical system 34 to transmit in each case one bundle of light rays in the direction of the transport belt 23 which has an oval cross-section and defines a monitoring segment 29.

Figure 2:
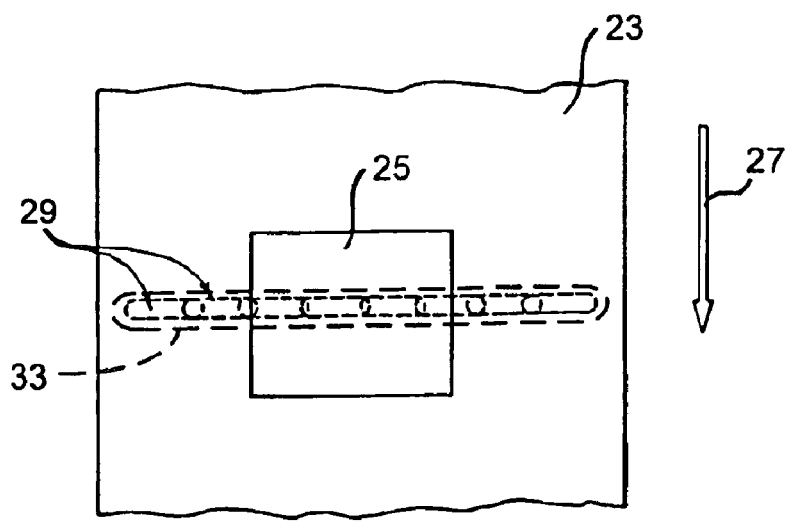
FIG. 2 is a plan view of this transport belt.

As can be seen from the plan view in accordance with FIG. 2, the monitoring segments 29 and/or the corresponding light spots on the transport belt 23 and/or on the package 25 are arranged in a linear manner along the longitudinal direction of their respective oval cross-sections and they overlap slightly. This linear arrangement extends parallel to the linear arrangement of the transmitter elements 13 and perpendicular to the transport direction 27. The transmission light bundle transmitted by the transmitter elements 13 in accordance with the monitoring segment 29 thus forms a strip illumination of the transport belt 23 and/or of the package 25 disposed thereon.

The sensor 11 functions as follows:

The light transmitted by the transmitter elements 13 in accordance with the explained strip illumination and/or with the monitoring segments 29 is reflected or remitted by the transport belt 23 and/or the package 25 and is imaged via an optical reception system—not shown—and via the beam splitter 15 onto the reception device 17. This passes on corresponding received signals to an evaluation device—likewise not shown.

In that the transport belt 23, and thus also the package 25, are moved continuously along the transport direction 27 and a corresponding synchronization signal is communicated to the evaluation device, the evaluation device can detect and calculate a two-dimensional image by a line-wise scanning of the transport belt 23 and of the package 25 to detect, for example, the position of the package 25 or to read and analyze a code applied thereto. In other words, image information is put together by a periodic detection of the moved and strip illuminated transport belt 23 and package 25.

The reflected and/or remitted light of the monitoring segments 29 of the strip lighting is furthermore imaged on respectively associated receiver elements 21 of the additional reception device 19. Each receiver element 21 can be connected at times to the associated transmitter element 13 and to a filter module 37 via a multiplexer 30 to form a resonant circuit. The evaluation device measures the resonant frequency of this resonant circuit and this frequency in turn delivers information on the phase shift of the respectively transmitted and reflected and/or remitted light and thus information on the distance of the transport belt 23 or of the package 25 from the sensor 11. The evaluation unit thus works, together with the respective transmitter element 13, receiver element 21 and the filter module, as a distance measuring device.

The distance information gained in this manner is used in the sensor 11 to continuously match the focus position of the reception device 17 provided for the actual image detection, that is, to track it in accordance with the height of the package 25 or in accordance with other objects moved through the strip illumination. For this purpose, an adjustment device 32 is provided for the optical reception system which is controlled by the evaluation device.

A particular advantage of the sensor 11 consists of the transmitter elements 13 and the evaluation device not only being used for the actual image detection, but, at the same time, also for the distance determination which is made possible by the described tracking of the focus position.

It must still be noted with respect to the sensor 11 that one of the transmitter elements 13, or a further transmitter element, can be provided to transmit a further transmitted light ray in the direction of a reference object 36 inside the sensor 11 which is detected by means of the reception device 17, of the additional reception device 19 or of a reference receiver element of its own. A signal produced from this can be used as a reference value to detect and take into account changes in the calibration conditions which can be caused, for example, by aging or temperature effects. A reference measurement of this kind can be carried out with each measurement of a line of monitoring segments 29 or at regular intervals of time, with the respective reference signal being able to be supplied to the evaluation device, for example, via the multiplexer.

In one embodiment of the invention an amplitude modulation of the transmission device or of individual transmission elements 13 is provided for the distance determination. A filter module is provided for the formation of a resonant circuit together with the transmission device 13 and with the reception device 35 and/or with the additional reception device 19, or an oscillator 39 and a phase comparator 40.

In a further embodiment of the invention the transmission device 13 has an optical transmission system 34 through which a transmitted light ray can be transmitted in the direction of a reference object inside sensor 11. A reference signal can be produced in dependence on the light that is reflected or remitted by a reference object 36, by the reception device 17, by the additional reference device 19, and/or by the reference reception element 35.

Figure 3:
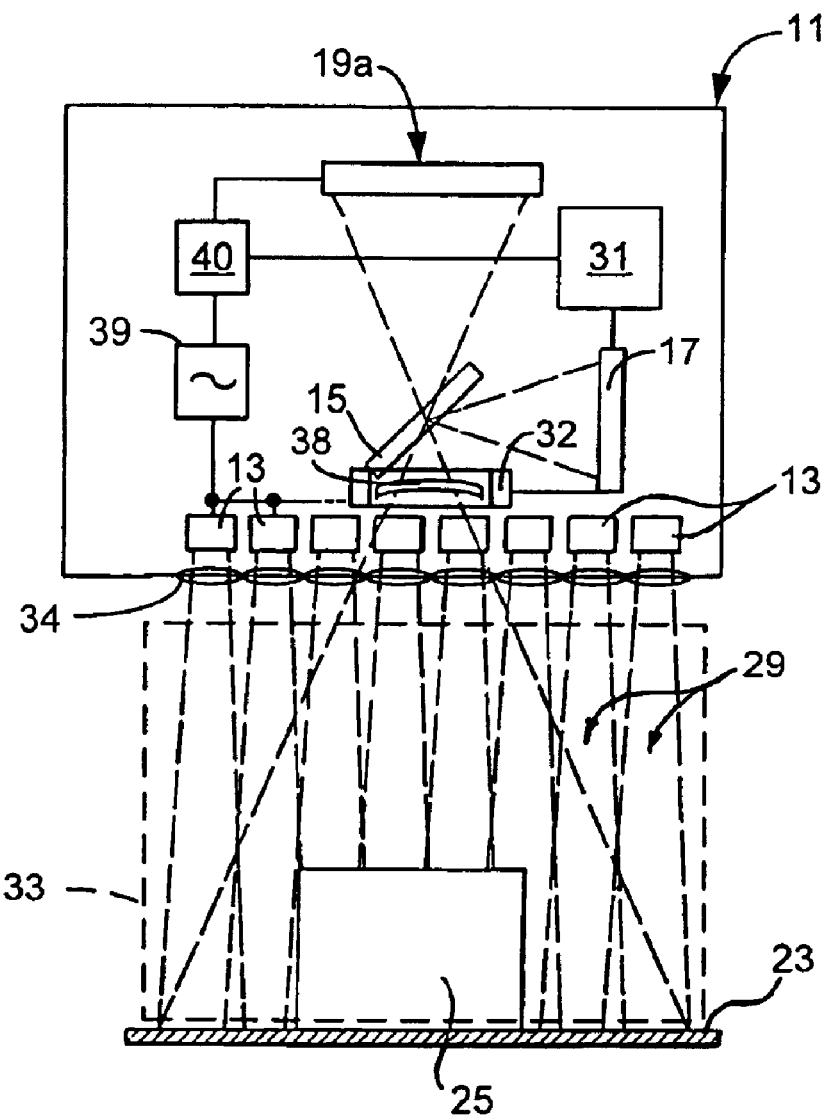
FIG. 3 is a view similar to FIG. 2 and shows another embodiment of the invention.

In another embodiment of the invention an astigmatic optical reception system 38 is provided. In this case the reception device and/or the additional reception device has a single reception element 19a as is shown in FIG. 3.

It must further be noted that a plurality of lines of transmitter elements 13 and/or of receiver elements 21 can be arranged behind one another with respect to the transport direction 27 so that a plurality of parallel linear arrangements of monitoring segments 29 are produced and/or detected.

What is claimed is:

1. An optoelectronic sensor, comprising a transmission device for transmitting a strip illumination in the direction of an object zone; a reception device for receiving the strip of illumination reflected or remitted from the object zone and for outputting at least one corresponding reception signal; an evaluation device for evaluating the at least one reception signal for the purpose of image detection, wherein a strip illuminated object region is divided into a plurality of monitoring segments; an additional reception device for receiving illumination reflected or remitted from the object zone and for outputting at least one corresponding additional reception signal which is used for determining the distance between the sensor and an object within the object zone; and a beam splitter at a reception side which images one part of the illumination reflected or remitted from the object zone onto the reception device and another part onto the additional reception device.

2. A sensor in accordance with claim 1, wherein the focus position of an optical reception system and/or of an optical transmission system can be set in dependence on a distance measured for a monitoring segment.

3. A sensor in accordance with claim 1, wherein the transmission device has a respectively associated transmission element for the plurality of monitoring segments.

4. A sensor in accordance with claim 1, wherein the reception device and/or the additional reception device is made spatially resolving and includes a plurality of receiver elements respectively associated with the plurality of monitoring segments.

5. A sensor according to claim 4, wherein at least one of the reception device and the additional reception device comprises a row of photo receivers.

6. A sensor in accordance with claim 1, wherein an astigmatic optical reception system is provided and the reception device and/or the additional reception device has a single reception element.

7. A sensor in accordance with claim 1, wherein the distance to an object disposed in the monitoring segment is determined for a plurality of monitoring segments.

8. A sensor in accordance with claim 7, wherein the distance for the plurality of monitoring segments is determined sequentially or in parallel.

9. A sensor according to claim 7 wherein the distance to an object disposed in the monitoring segment is determined for all monitoring segments.

10. A sensor in accordance with claim 1, wherein the distance is determined by amplitude modulation, and including at least one of a filter module forming a resonant circuit together with the transmission device and the additional reception device, and an oscillator cooperating with a phase comparator.

11. A sensor in accordance with claim 1, wherein the monitoring segments are arranged perpendicular to an optical axis of the transmission device adjacent to one another.

12. A sensor according to claim 11 wherein the monitoring segments are arranged separate from each other.

13. A sensor in accordance with claim 11 wherein the monitoring segments adjoin each other.

14. A sensor according to claim 11 wherein the monitoring segments overlap each other.

15. A sensor in accordance with claim 1, wherein the monitoring segments have a longitudinal form within a plane perpendicular to an optical axis of the transmission device, the monitoring segments being arranged adjacent to one another along their longitudinal form.

16. A sensor in accordance with claim 1, wherein the evaluation device is adapted to calculate image information from the reception signals corresponding to the monitoring segments.

17. A sensor in accordance with claim 1, wherein the evaluation device is configured to calculate or estimate a volume of the object disposed in the object zone from the reception signals corresponding to the monitoring segments.

18. A sensor in accordance with claim 1, wherein the strip illuminated object zone is divided into at least three monitoring segments.

19. A sensor in accordance with claim 1, wherein the transmission device has a transmission element through which a transmitted light ray can be transmitted in the direction of a reference object inside the sensor; and wherein a reference signal is produced in dependence on light reflected or remitted by at least one of the reference object, the reception device, the additional reference device, and a reference reception element.

20. A sensor in accordance with claim 1 including an adjustment device operatively coupled with the evaluation device for adjusting a focus position of the reception device in accordance with the distance between the sensor and the object in the object zone.

21. An image processing system comprising a conveyor for the transport of objects through an object zone in a first direction, and a sensor associated with the conveyor and comprising a transmission device for transmitting a strip illumination in the direction of an object zone; a reception device for receiving the strip of illumination reflected or remitted from the object zone and for outputting at least one corresponding reception signal; an evaluation device for evaluating the at least one reception signal for the purpose of image detection, wherein a strip illuminated object region is divided into a plurality of monitoring segments; and an additional reception device for receiving illumination reflected or remitted from the object zone and for outputting at least one corresponding additional reception signal which is used for determining the distance between the sensor and an object within the object zone; and a beam splitter at a reception side which images one part of the illumination reflected or remitted from the object zone onto the reception device and another part onto the additional reception device.

* * * * *